United States Patent

Tonn

[15] 3,701,452
[45] Oct. 31, 1972

[54] SEALING GASKET FOR A CONTAINER

[72] Inventor: Erwin W. Tonn, 7734 S. Christiana, Chicago, Ill. 60652

[22] Filed: Sept. 7, 1971

[21] Appl. No.: 178,280

[52] U.S. Cl. .................................................. 220/46 R
[51] Int. Cl. ............................................... B65d 53/00
[58] Field of Search ............. 220/46 R; 277/201, 214

[56] References Cited

UNITED STATES PATENTS 3,441,166   4/1969   De Frees ................. 220/46 R
2,969,252   1/1961   Eruver ..................... 220/46 R Primary Examiner—George T. Hall
Attorney—Wilfred S. Stone

[57] ABSTRACT

An improved sealing gasket for providing a seal for vessels subject to a differential in pressure.

6 Claims, 7 Drawing Figures

PATENTED OCT 31 1972

3,701,452

INVENTOR.
Erwin W. Tonn
BY
Stone, Zummer & Aubel
Attys

SEALING GASKET FOR A CONTAINER

Various different types of elastically returnable sealing gaskets for providing a sealing strip for pressure vessels are known. The present invention relates broadly to improvements in such sealing gaskets and in one particular application to sealing gaskets forming a sealing strip for high pressure vessels such as food pressure cookers wherein a seal must be provided between the cooker and its associated cover due to the fact that the cooker is heated to a high temperature and a high differential pressure exists between the interior of the cooker and the atmosphere.

In one such application the sealing gasket of the invention is used as a sealing strip for a pressure cooker approximately 22 inches in peripheral dimension for cooking for example, chicken, wherein a heat of approximately 350° and a pressure of 15 pounds per square inch must be maintained in the vessel.

The gasket of the invention can be used for a variety of different high pressure applications and will withstand temperatures of 500° F above zero and 85° F below zero.

An advantage of the present gasket is that it is self-contained in its associated cavity or groove and does not have to be vulcanized in its cavity as do other gaskets. It can thus be removed and replaced in a few minutes.

Also, the gasket of the invention can be used in a vacuum and generally in any type of application where a positive seal is required.

Accordingly, it is a principal object of the present invention to provide a sealing gasket to effect a sealing strip along the periphery of a vessel and on associated cover secured to the vessel.

The foregoing and object objects, features and advantages of the invention will be apparent from the following more particular description of a preferred embodiment of the invention, as illustrated in the accompanying drawings.

Figure 1:
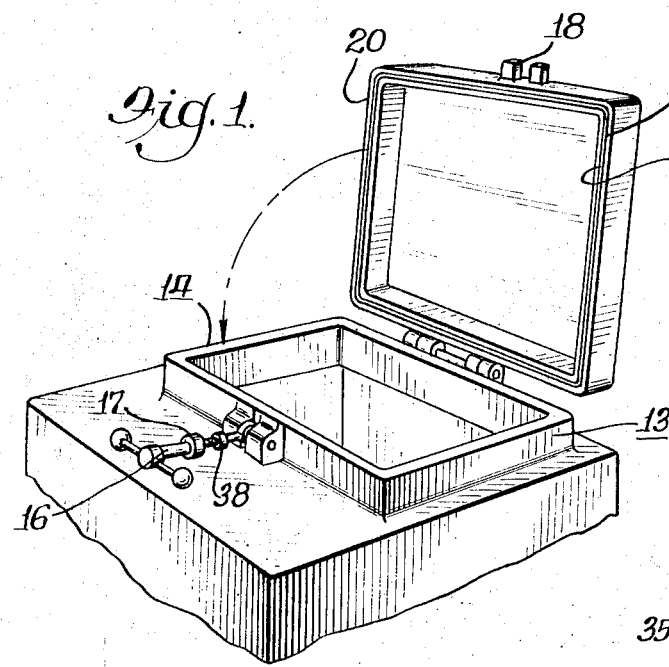
FIG. 1 is a schematic showing of a pressure vessel indicating a sealing gasket in accordance with the invention with the gasket providing a seal between the open periphery of the pressure vessel and the associated cover.

Referring to the various figures, a pressure vessel 13 which utilizes the sealing gasket 11 of the invention is shown in FIG. 1. In the embodiment indicated food is cooked in vessel 13 under elevated pressure and heat. However, as mentioned above, it should be understood that the inventive gasket can be used for general applications including any type of applications where a differential in pressure exists between the interior of the vessel and the exterior of the vessel and including vacuum applications.

Gasket 21, in one embodiment, is made of resiliently compressible silicone material. A cover 11 having an open edge surface 20, which in turn includes a groove 19 for receiving the gasket 21, is provided for pressure vessel 13. When cover 11 is closed the gasket 21 abuts against and seals the periphery of the open edge 14 of vessel 13. Cover 11 is tightly affixed to the pressure vessel as by a suitable bolt or bolts indicated as at 16. The bolt 16 which may be of any suitable type, engages the cover 11 as by being inserted into associated lugs 18 in the cover, and the cover is tightly affixed to the vessel as by the bolt 16 and nut 17 combination.

The open groove 19 formed on the edge surface 20 of cover 11 extends completely around the periphery of the cover. The groove 19 is formed to have, in cross-section, a rectangular bottom opening (see FIG. 2), side extending recesses and a semi-circular upper surface. The sealing gasket 21 of the invention is inserted in the groove 19.

Figure 3:
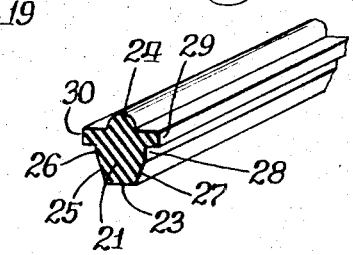
FIG. 3 is an isometric view of a length of a sealing gasket of FIG. 2.
Figure 2:
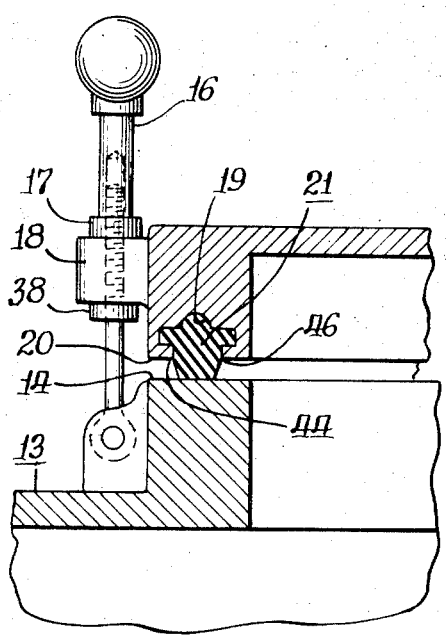
FIG. 2 is an enlarged view partially in cross-section showing a cross-section of the sealing gasket of the invention as mounted in position.

The gasket 21 is shaped along its approximate upper half portion to conform and fit into the groove 19. The lower portion of the sealing gasket 21 extends downwardly of the upper surface 20. Referring now particularly to FIGS. 2 and 3, the bottom surface 23 of the gasket 21 is flat (along a horizontal line as oriented in FIG. 3) and bears against the upper edge surface 14 of the vessel 13 when cover 11 is closed, see FIG. 2. The sides 25 and 27 of gasket 21 angle outwardly from the surface 23, and extend upward to perpendicular sides 26 and 28 conforming to the straight sides of the groove 19. The upper portion of the gasket includes flanges 29 and 30, (rectangular in cross-section) which extend outwardly from the longitudinal axis of the sealing gasket to engage the conforming recesses in groove 19. The upper portion of the gasket 21 is rounded as at 24 and conforms to the rounded top of groove 19.

When the cover 11 is tightened onto the surface 14 of the pressure vessel 13, the flat bottom surface 23 of gasket 21 bears against surface 14 to provide a seal there between. For various applications a stop 38 may be positioned on bolt 16 to limit the amount that bolt can be turned to tighten cover 11 onto the upper surface 14, and thus to also limit the pressure applied to the surface 23 of gasket.

Figure 4:
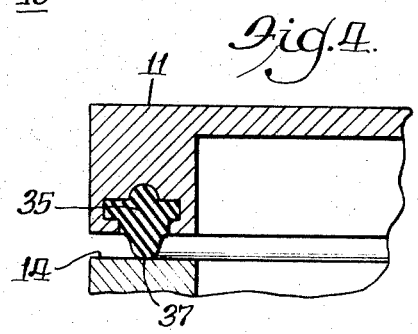
FIG. 4 is a cross-section of another embodiment of a sealing gasket of the invention shown mounted in position.
Figure 5:
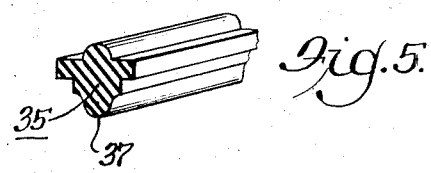
FIG. 5 is an isometric view of the length of the sealing gasket of FIG. 4.

A second embodiment of the sealing gasket 35 of the invention is shown in FIGS. 4 and 5. In this embodiment, the upper portion of the sealing gasket 35 is similar to the upper portion of gasket 21 of FIGS. 2 and 3. In the embodiment of FIGS. 4 and 5, however, the bottom surface 37 of the gasket 35 is rounded and reduced in width relative to the bottom surface 23 of gasket 21. It has been found that the reduced and rounded lower surface 37 of sealing gasket 35 enables an increased amount of pressure to be placed on the sealing gasket without damage to the gasket.

While the sealing gasket 21 is generally acceptable for most applications, it may be damaged if the stop 38 is damaged or removed. If, for example, the stop 38 is removed and the cover 11 is brought down too tightly against upper surface 14, cover 11 may bear down tightly against gasket 21 and push the tapered surfaces 25 and 27 and, or, the side surfaces 24 and 26 against the metal edges 44 and 46 of the upper surface 14. This may cause the gasket 21 to tear and be ineffective.

Figure 6:
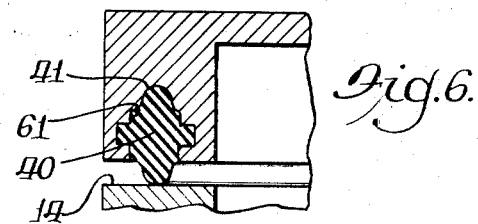
FIG. 6 is a cross-section of a third embodiment of the sealing gasket of the invention shown mounted in position; and, FIG. 7 is an isometric view of a length of the sealing gasket of FIG. 6.
Figure 7:
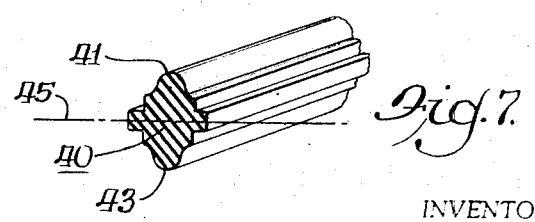

Another embodiment of the sealing gasket in accordance with the invention is shown in FIGS. 6 and 7. The gasket 40 of FIG. 6 is generally similar to the gasket 35. However, gasket 40 has the advantage that it is reversible; that is, it is symmetrical about a horizontal axis as indicated by the dot-dash line 45. The top and bottom portions 41 and 43 are essentially identical. The advantage of the sealing gasket 41 of FIGS. 6 and 7 is that if wear occurs on the lower surface 43, or if lower portion of the gasket 43 is damaged, the gasket can then be pulled out of its associated groove 61, turned over and reinserted in groove 61 in relative reverse position, wherein portion 43 would then be the top, and would fit into the groove 61. The symmetry of the gasket 40 permits the life of the gasket to be increased, in fact, essentially doubled.

While the invention has been particularly shown and described with reference to some preferred embodiments thereof, it will be understood by those skilled in the art that various changes in form and details may be made therein without departing from the spirit and scope of the invention.

I claim:

1. A sealing gasket adapted to provide a sealing strip between a vessel and an associated closure member, said gasket being partially insertable in an associated open groove formed to open between said closure member and said vessel, said gasket comprising, in combination, a first gasket portion conforming to said groove and adapted to be inserted in said groove, said first gasket portion including flanges for engaging said groove to enable said gasket to be firmly retained therein, a second gasket portion, having its surface reduced in cross-section relative to the width of the opening of the groove whereby when said closure member is closed said second gasket portion even if deformed will not be engaged by the sides or edges of said groove and will not be damaged thereby.

2. A sealing gasket as in claim 1 wherein the first gasket portion is in cross section the same as said second gasket portion to thereby provide a reversible gasket, and hence extends the operating life of the gasket.

3. A sealing gasket as in claim 1 wherein the gasket is self retained in its groove.

4. A sealing gasket as in claim 1 wherein the second gasket surface is a rounded surface.

5. A sealing gasket as in claim 1 wherein the gasket provides a seal for both high pressure and vacuum application.

6. A sealing gasket as in claim 1 wherein the gasket is made of resilient silicone material.

* * * * *